| United States Patent [19] | [11] Patent Number: 4,897,272 |
| Kubota et al. | [45] Date of Patent: Jan. 30, 1990 |

[54] PROCESS FOR PRODUCING RICE VINEGAR

[75] Inventors: Terumasa Kubota, Toyohashi; Isao Itoh, Kashihara; Shinji Tanijiri, Suita, all of Japan

[73] Assignee: Tamanoi Vinegar Corporation Limited, Osaka, Japan

[21] Appl. No.: 123,595

[22] Filed: Nov. 20, 1987

[51] Int. Cl.⁴ ................................................ C12J 1/04
[52] U.S. Cl. ........................................ 426/17; 426/495
[58] Field of Search .................. 426/17, 7, 271, 490, 426/495

[56] References Cited

U.S. PATENT DOCUMENTS

| 4,092,434 | 5/1978 | Yoshizumi et al. | 426/13 |
| 4,156,025 | 5/1979 | Dalgleish | 426/271 |
| 4,313,960 | 2/1982 | Campagne | 426/271 |
| 4,499,117 | 2/1985 | Bonneau | 426/592 |
| 4,624,805 | 11/1986 | Lawhon | 530/376 |

*Primary Examiner*—Marianne Cintins
*Attorney, Agent, or Firm*—Wenderoth, Lind & Ponack

[57] ABSTRACT

The present invention is based on the finding that peculiar odors in rice vinegar are derived from organic acids and nitrogen derivatives, etc. formed upon production and it concerns a process for producing rice vinegar of enriched flavor, wherein the amount of peculiar odor-forming organic acids formed in the production step of the rice vinegar is as little as possible and a treatment for removing nitrogen compounds is applied and gluconic acid is added.

5 Claims, 2 Drawing Sheets

PROCESS FOR PRODUCING RICE VINEGAR

BACKGROUND OF THE INVENTION

1. Field of the Invention

The present invention concerns a process for producing rice vinegar by forming a saccharified liquid from rice as the starting material and applying alcoholic fermentation, or by directly applying alcoholic fermentation to the starting rice by way of an enzymatic non-cooking process, and then applying acetic acid fermentation with acetic acid bacteria.

2. Description of the Prior Art

Rice vinegar has long been used as a sour seasoning and has been generally favored in cooking for Sushi or the like.

The process for producing rice vinegar known so far has been conducted by processing rice as the starting material, applying alcoholic fermentation, denaturing the resultant MOROMI (fermentation product) with brewed vinegar, then removing KASU (residue), leaving the product for a predetermined of period, removing ORI (precipitates) and applying acetic acid fermentation by the aerated stirring process to the resultant liquor material (refer, for example, to Japanese Patent Publication No. Sho 57-5510).

There has also been known a process for producing vinegar by applying alcoholic fermentation to non-cooked cereals or processed cereals while adding malt (=koji), enzyme and vinegar or acetic acid and then applying acetic acid fermentation (refer, for example, to Japanese Patent Laid-Open No. Sho 61-11913).

The production processes in the prior art as described above have a drawback of causing so-called stuffy odors, since there have often been contamination risks with miscellaneous bacteria upon alcoholic fermentation, acetic fermentation or during storage. Lactic acid is formed, for example, due to the contamination with lactic acid bacteria in alcoholic fermentation and is converted into acetoin or diacetyl upon acetic acid fermentation or during storage, to cause so-called stuffy odors.

In the conventional rice vinegar production process described above, the brewing step and the temperature of the alcoholic fermentation are controlled so that no rancidity or other contamination may be caused and acetic acid fermentation is carried out after removing residues or precipitates introduced from MOROMI after the completion of the alcoholic fermentation. However, these procedures have not yet completely solved the foregoing problems.

In addition, in the conventional vinegar production process as described above, there have been attempts to suppress the generation of lactic acid bacteria by conducting non-cooked alcoholic fermentation at 20-35° C. while adding vinegar or acetic acid, thereby reducing the formation of lactic acid which forms a precursor of undesired odors referred to as stuffy odors during acetic acid fermentation. However, since the peculiar odors in vinegar are derived not only from such stuffy odors but also from nitrogen compounds derived from the starting material, no complete solution have yet been obtained.

SUMMARY OF THE INVENTION

The present invention has been accomplished based on the finding that the peculiar odors in rice vinegar are derived from the stuffy odors of acetoin and diacetyl, as well as from peculiar odor-producing organic acids such as valeric acid, isovaleric acid, butyric acid, isobutyric acid and propionic acid and nitrogen compounds derived from the starting material and that the foregoing problems can effectively be overcome by controlling the amount of the soluble nitrogen in the saccharified liquid or alcohol, blending a gluconic acid fermentation liquid in rice vinegar and bottling them under a sterilize state without heating, controlling the amount of soluble nitrogen and lactic acid in the alcoholic fermentation MOROMI, or applying solid-liquid separation after the liquefaction thereby suppressing the amount of the soluble nitrogen.

Specifically, the present invention provides a process for producing rice vinegar by saccharifying starting rice, applying alcoholic fermentation and acetic acid fermentation, wherein the process includes a method of applying a nitrogen-removing treatment thereby controlling the amount of soluble nitrogen, a method of mixing the gluconic acid fermentation liquid to the fermentation liquid after the acetic acid fermentation, filtering the liquid mixture with filtration membranes of less than 0.2 um pore size thereby removing Acetobacter and impurities, a method of adding an enzymatic preparation mainly composed of glucoamylase and yeast to the starting rice and applying alcoholic fermentation while controlling the amount of soluble nitrogen and the amount of lactic acid formed in the alcoholic fermentation MOROMI, conducting solid-liquid separation and then applying acetic acid fermentation said method being conducted in the absence of malt, or a method of liquefying starting rice by adding an enzyme preparation mainly composed of a-amylase, conducting solid-liquid separation and applying saccharification and alcoholic fermentation using the resultant liquefied liquid or powders prepared from the liquefied liquid as the starting material and then applying acetic acid fermentation.

The present invention will be described more specifically.

Rice was subjected to the steps of water washing, liquefication, saccharification, alcoholic fermentation and processed to obtain alcohol MOROMI. In this case, soluble nitrogen is removed or controlled by using ion exchange resin, ultrafiltration membrane and/or activated carbon in the saccharified liquid or alcohol and then acetic acid fermentation is applied. Separately, glucose or saccharified liquid of cereals is previously added to the fermentation liquid during aerated acetic acid fermentation to obtain the gluconic acid. The resultant fermentation gluconic acid liquid is blended with the acetic acid fermentation liquid, which is then filtered through filtration membranes of less than 0.2 um pore size to remove acetic acid bacteria and impurities to prepare rice vinegar products. The effect of removing nitrogen in the saccharified liquid or alcohol is as shown below (Table-1).

TABLE 1

| | Saccharide liquor-alcohol MOROMI Treating process | | | | |
|---|---|---|---|---|---|
| | Ion exchange | Ultrafiltration | Activated carbon | Amount of soluble nitrogen (mg/100 ml) | Sensory evaluation |
| 1. Saccharified liquid | | | + | 62 | 1.5 |
| 2. Saccharified | + | | | 61 | 1.3 |

TABLE 1-continued

| | Saccharide liquor-alcohol MOROMI | | | | |
|---|---|---|---|---|---|
| | Treating process | | | | |
| | Ion ex-change | Ultra-filtra-tion | Acti-vated carbon | Amount of soluble nitrogen (mg/100 ml) | Sensory evaluation |
| liquid | | | | | |
| 3. Saccharified liquid | + | | + | 41 | 1.8 |
| 4. Alcohol MOROMI | | + | | 98 | 1.2 |
| 5. Alcohol MOROMI | | + | + | 60 | 1.5 |
| 6. Alcohol MOROMI | + | | | 56 | 1.4 |
| Not-treated saccharification liquid (Conventional process) | | | | 82 | 0.3 |
| Not processed alcohol MOROMI (Conventional process) | | | | 142 | −0.1 |

The sensory evaluation was conducted as described below. A sensory test was conducted by ten panelers using the following scoring method while using the product prepared by the conventional process as a control. The scores were classified into 5 groups as follows point 2: excellent, point 1: good, point 0: ordinary, point −1: poor and point −2: extremely poor.

As shown in Table-1, the amount of the soluble nitrogen can be controlled by various treatments. In addition, it can also be controlled by varying the liquid passing speed through the ion exchange resin or by the use of ultrafiltration membranes of different fractional molecular weights. The treatment with activated carbon used herein is effective both in the batch and column methods.

It can be seen from Table-1 that a better sensory result can be obtained with a lesser amount of soluble nitrogen.

Explanation will be made to the gluconic acid fermentation. During aerated acetic fermentation, glucose or saccharified liquid of cereals is added such that the saccharide concentration is kept within a range from 2 to 14% in the fermentation liquid and the fermentation is continued to obtain a fermentation liquid with the gluconic acid concentration from 0.5 to 13%. The resultant fermentation liquid is used as it is for rice vinegar or, in a case where the gluconic acid concentration is high, it is added to a rice vinegar fermentation liquid such that a proper gluconic acid concentration is attained to thereby obtain rice vinegar of mild sourness and of enriched taste.

In Table-2, rice vinegars produced in Example 3 were compared between those containing and not containing gluconic acid.

TABLE 2

| Test products | Panelers showing preference |
|---|---|
| Rice vinegar with no gluconic acid | 3 |
| Rice vinegar with 0.5% gluconic acid | 17 |

High evaluation was given in that the sourness was rendered mild due to the presence of gluconic acid.

Incorporation of lugconic acid into rice vinegar is also effective for improving the quality.

Table-3 shows the result of removing bacteria from the acetic fermentation liquid after each of the pre-filtration and fine filtration.

TABLE 3

| Process | Number of bacteria |
|---|---|
| After acetic acid fermentation | $1.1 \times 10^{11}$ |
| After pre-filtration (primary) | $7.6 \times 10^{7}$ |
| After pre-filtration (secondary) | $9.1 \times 10^{4}$ |
| After fine filtration | negative |

In the aging step, since the acetic acid fermentation liquid is sterile and, therefore, not contaminated with miscellaneous bacteria, particularly, Acetobacter Xylinum, etc. so-called stuffy odors are scarcely resulted and, moreover, various enzymes contained in the acetic acid fermentation can not provide effects on miscellaneous bacteria but act effectively so as to produce both excellent flavor and mild taste.

Commercially available glucoamylase preparations generally contain protease and, for controlling the amount of the soluble nitrogen, it is necessary to control the protease activity as the rate determining factor. The present inventors have already reported that the amount of the soluble nitrogen can be controlled by controlling the protease activity, particularly, for the rice as the starting material in the Joint Meeting of Kansai and Nishinippon Branches of Japanese Society of Agricultural Chemistry, held in 1987.

While there are various methods, the protease can completely be deactivated by adding sodium carbonate to 1% enzyme solution to adjust pH to 7.8 and treating at 40° C. for 30 minutes.

Furthermore, it is also possible to control the amount of the soluble nitrogen by preparing enzyme preparations of different protease deactivation rate of protease activity.

Explanation will be made for the properties of the products according to the present invention under various conditions while referring to actual examples.

For suppressing the amount of the soluble nitrogen in the alcoholic fermentation, a method of lowering the fermentation temperature can be used, but it requires an extremely long period for the fermentation and the process is not industrially suitable, as well as it is not an effective control method for the amount of the soluble nitrogen (refer to FIGS. 1 and 2).

The the glucoamylase activity and the protease activity of glucoamylase preparations applied with alkali treatment and added to 100 g of the starting material are shown below (Table-4).

TABLE-4

| | Control | Treated |
|---|---|---|
| Glucoamylase activity | 21000 U (unit) | 21000 U (unit) |
| Protease activity | 700 U (unit) | 0 |

The activity of the glucoamylase and protease preparations were measured according to the analysis method specified by The Tax Administration Agency and the result is as follows.

Glucoamylase Activity

An enzyme is acted on starch as the substrate and reducing sugar formed by the enzymatic effect is determined by colorimetry using Glucose B-Test wako enzyme kit (Wako Junyaku Co.). Activity: The activity is defined as 1 U (unit) when 10 mg of glucose is formed in 30 minutes under the condition of pH 4.5 and 40° C.

Protease Activity

An enzyme is acted on milk casein as the substrate, undigested casein was removed after precipitation with a trichloroacetic acid solution, the soluble decomposition product is caused to develop color by an alkaline Folin's test solution and the absorption at 660 nm is measured and quantitatively determined.

Activity: The activity is defined as 1 U (unit) when an amino acid corresponding to 1 umol of tyrosine is formed in 60 minutes under the condition of pH 3 and 40° C.

When using a protease inactivated enzyme preparation, only in the case of using rice as the starting material, there has been obtained a specific effect that the fermentation yield is quite the same and the amount of the soluble nitrogen and the lactic acid formed can be suppressed respectively to about 50% (Table-5).

TABLE 5

(Alcohol MOROMI)

| Enzyme | Fermentation temperature | | | |
|---|---|---|---|---|
| | 20° C. | | 30° C. | |
| | Control | Treated | Control | Treated |
| Fermentation days | 7 | 11 | 4 | 6 |
| Lactic acid (ppm) | 510 | 220 | 630 | 380 |
| Total N (mg/100 ml) | 174.4 | 93.6 | 269.0 | 127.6 |

Further, when a relationship between the amount of the soluble nitrogen and the amount of lactic acid formed in the alcohol MOROMI and the peculiar odors of vinegar after the acetic acid fermentation was examined, it was found that the amount of odor-forming volatile organic acids in the acetic acid fermentation was increased as the amount of the soluble nitrogen was increased (refer to FIG. 3, in which the total amount of valeric acid, isovaleric acid, butyric acid, isobutyric acid and propionic acid are shown as the volatile ingredients), as well as that the amount of acetoin causing so-called stuffy odor was increased as the amount of the lactic acid was greater in the acetic acid fermentation (FIG. 4).

This indicates the necessity for preparing an alcohol containing less soluble nitrogen and lactic acid for the alcoholic fermentation in order to obtain vinegar of favorable taste, as well as that the foregoing object can be attained by using a protease-deactivated enzyme preparation according to the present invention when using rice as the starting material.

Measurement was carried out by using the HPLC organic acid analysis system for organic acids, GC (head space method) for acetoin and Barker & Summerson method for lactic acid.

As has been described above, protease activity as the rate detering factor has to be controlled in order to control the amount of the soluble nitrogen upon preparing vinegar and this can be attained by keeping the starting material and the saccharifying enzyme from being in contact with each other. That is, it has been found that vinegar of less soluble nitrogen and with refresh taste can be obtained with no effect of protease in glucoamylase, by conducting solid-liquid separation after the completion of the liquefaction to obtain a liquefied liquid, and then applying alcoholic fermentation and acetic acid fermentation while adding a glucoamylase preparation and yeast to the liquefied liquid (Table-6).

TABLE-6

| Specimen | Amount of soluble nitrogen (mg/100 ml) | Sensory evaluation |
|---|---|---|
| 9 | 35 | 1.7 |
| Control | 82 | 0.3 |

The sensory evaluation was conducted in the same method as in Table-1.

According to the present invention, it has been found that rice vinegar of refresh taste with less amount of volatile organic acids and acetoin as peculiar odor ingredients can be produced by suppressing or controlling the amount of soluble nitrogen and also suppressing the amount of lactic acid formed upon preparing the vinegar starting from rice and the present invention provides various processes for attaining such a purpose. Further, the present invention can to enrich the taste and improve the mildness of the sour taste by blending gluconic acid fermentation liquid to rice vinegar.

That is, the following effects have been discovered in the present invention.

(1) Since rice vinegar is produced from the starting rice while controlling the amount of soluble nitrogen by a nitrogen-removing treatment in the saccharified liquid or alcohol MOROMI, by which the odors derived from the nitrogen ingredients can be decreased.

(2) Since gluconic acid is contained in rice vinegar, it is possible to produce rice vinegar of mild sourness.

(3) Since bottling is conducted under sterile state by fine filtration with no heating, low boiling ingredients such as volatile acids contributing to the taste are not lost. Further, since various enzymes are contained in the active state, rice vinegar of further enriched taste can be obtained.

(4) Rice vinegar of refresh taste while suppressing the content of volatile organic acids and acetoin causing peculiar odors after the acetic acid fermentation can be produced, since the amount of the soluble nitrogen and that of lactic acid formed can be controlled by using a protease-deactivated glucoamylase preparation in the alcoholic fermentation.

(5) Since the liquefied liquid of rice is powderized, transportation and storage are facilitated, and rice vinegar of favorable taste can be produced while suppressing the amount of soluble nitrogen by using liquefied liquid or powder obtained therefrom as the starting material.

BRIEF DESCRIPTION OF THE ACCOMPANYING DRAWINGS

DESCRIPTION OF EXAMPLES

Example 1

Figure 1:
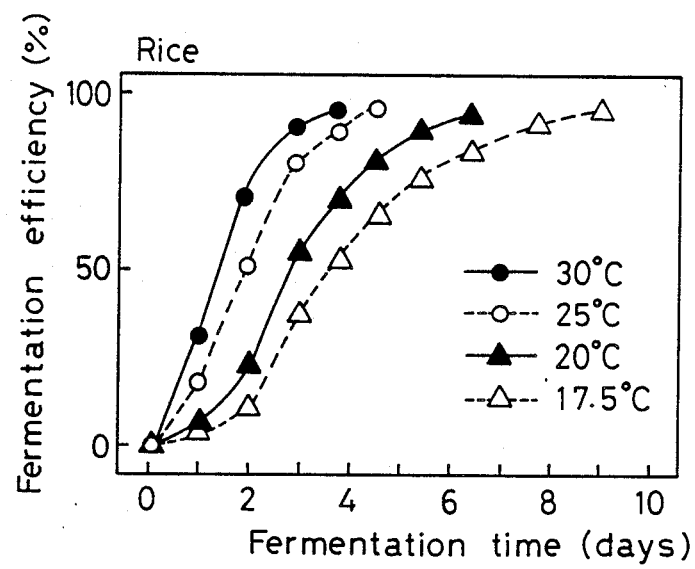
FIG. 1 is a graph showing a relationship between the fermentation efficiency and the fermentation time.
Figure 2:
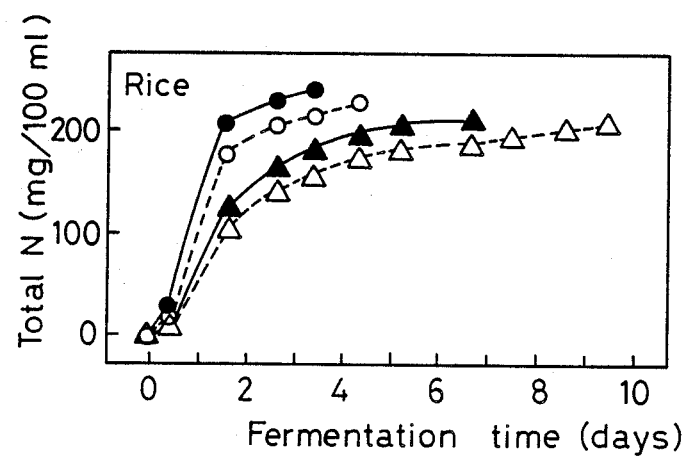
FIG. 2 is a graph showing a relationship between the amount of nitrogen and the fermentation time.
Figure 3:
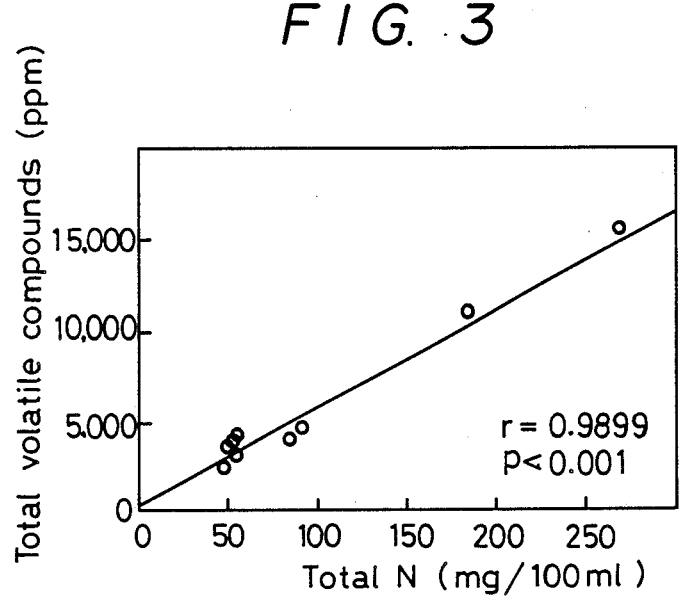
FIG. 3 is a graph showing a relationship between the amount of the volatile organic acid and that of the nitrogen.
Figure 4:
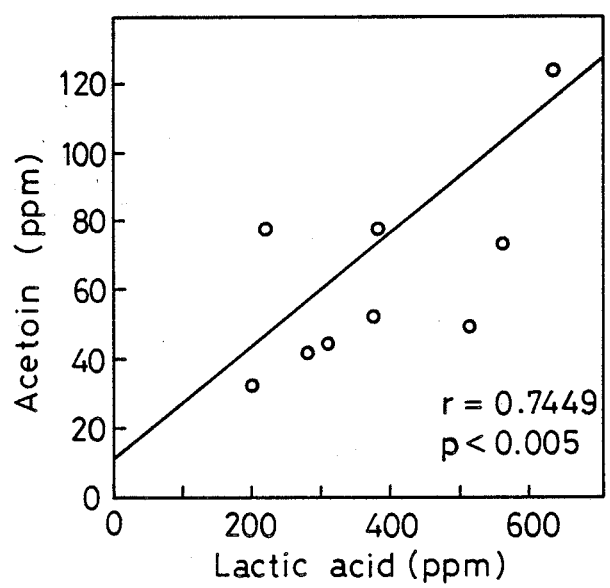
FIG. 4 is a graph showing a relationship between the amount of acetoin and that of lactic acid.

Rice was pulverized by 1 kg, to which 2.8 liter of charged water and 4 g of a-amylase preparation were added and heated and digested to alpharize and liquefy the starch in the starting material. Then, 1.2 g of glucoamylase preparation was further added and pH was adjusted to 4.5 with fumaric acid. After conducting saccharification at 50 °C.–60 °C. for one day, they were press-filtered to obtain 3.1 liter of saccharified liquid containing 82 mg/100 ml of soluble nitrogen and at 22% of saccharide concentration. After adding activated carbon (wet 50%) and maintaining for 30 minutes, the activated carbon was removed to obtain a saccharified liquid containing 62 mg/100 ml of soluble nitrogen. 3 g of yeast was added to the resultant saccharified liquid and alcoholic fermentation was applied at 28 °C. for four days to obtain 3.1 liter of alcohol MOROMI at 13.7% alcohol concentration. 1.15 liter of seed vinegar (10.0% acidity) and 1.25 liter of charged water were added to obtain 5.5 liter of MOROMI at 8.1% of alcohol concentration and 2.1% of acidity (hereinafter referred to as vinegar MOROMI). The vinegar MOROMI was added to 1 liter of seed vinegar containing active acetic acid bacteria previously cultivated in aeration fermentation in a fermentation device (acidity 8.0%, alcohol concentration 2.5%), and then acetic acid fermentation was applied. 6.5 liter of a fermentation liquid at 10.2% acidity was finally obtained. The fermentation liquid was subjected to pre-filtration by using diatomaceous earth and further to fine filtration by using filtration membranes composed of a nitrocellulose type sheet having fine pores of 0.2 um pore size to conduct sterilization. The resultant rice vinegar was excellent having refresh flavor.

EXAMPLE 2

Rice was pulverized by 1 kg, applied with liquefaction, saccharification and press-filtration in the same procedures as in Example 1 to obtain 3.1 liter of saccharified liquid containing 82 mg/100 ml of soluble nitrogen and at 22% saccharide concentration. The resultant saccharide liquid was continuously passed at SV:10 to 150 ml of strongly acidic cationic exchange resin IR-120B previously activated with HCl and 100 ml of strongly basic anionic exchange resin IRA-411 previously activated with NaOH to obtain 3.2 liter of a saccharide liquid containing 61 mg/100 ml of soluble nitrogen and at 21% saccharide concentration. 3 g of yeast was added to the resultant saccharide liquid and alcoholic fermentation was applied at 28° C. for 4 days to obtain 3.2 liter of alcohol MOROMI at 13.2% of alcohol concentration. 1.18 liter of seed vinegar (10.0% acidity) and 1.12 liter of charged water were added to obtain 5.5 liter of vinegar MOROMI at 8.1% alcohol concentration and 2.1% acidity.

Acetic acid fermentation was applied in the same procedures as in Example 1 and fine filtration was applied by using ultrafine filtration membranes having fractional molecular weight of 10,000.

Then, they were subjected to fine filtration with filtration membranes of 0.2 um pore size to remove bacteria. The resultant rice vinegar was excellent having refresh flavor.

Example 3

Rice was pulverized by 1 kg to form a saccharide liquid in the same procedures as in Example 2 and, after purifying with ion exchange resins, 6.2 g of activated carbon (wet 50%) was added to the resultant saccharide liquid to obtain 3.2 liter of saccharide liquid containing 41 mg/100 ml of soluble nitrogen and at 21% saccharide concentration.

Alcoholic fermentation, acetic acid fermentation and fine filtration were conducted in the same procedures as in Example 1 to obtain rice vinegar.

The resultant rice vinegar was of excellent flavor.

Example 4

Rice was pulverized by 1 kg and liquefied by adding 2.8 liter of charged water and 4 g of an α-amylase preparation, which was further saccharified by adding 1.2 g of glucoamylase. After cooling, 3 g of yeast was added and alcoholic fermentation was applied to obtain 3.1 liter of alcohol MOROMI at 14.0% alcohol concentration. After denaturing with speed vinegar, it was press-filtered to obtain 5.7 liter of vinegar MOROMI at 8.1% alcohol concentration, 2.1% acidity and containing 142 mg/100 ml of soluble nitrogen. The resultant vinegar MOROMI was filtered by using ultrafiltration membranes having fractional molecular weight of 10,000 under the condition of the filter pressure of 3.0 kg/cm$^2$ to obtain 5.5 liter of vinegar MOROMI containing 98 mg/100 ml of soluble nitrogen. The vinegar MOROMI was applied with acetic acid fermentation and fine filtration in the same procedures as in Example 1 to obtain rice vinegar of excellent flavor.

Example 5

Rice was pulverized by 1 kg and applied with liquefication, saccharification, alcoholic fermentation and ultrafiltration in the same procedures as in Example 4 to obtain vinegar MOROMI containing 98 mg/100 ml of soluble nitrogen. The resultant vinegar MOROMI was passed through at SV:5 to a column packed with 200 ml of activated carbon to obtain 5.5 liter of vinegar MOROMI containing 60 mg/100 ml of soluble nitrogen.

Then, acetic acid fermentation and fine filtration were applied in the same procedures as in Example 1 to obtain excellent rice vinegar of enriched taste.

Example 6

Rice was pulverized by 1 kg and applied with liquefaction, saccharification and alcoholic fermentation to obtain 3.1 liter of alcohol MOROMI at 14.0% alcohol concentration. After denaturation, solid-liquid separation was conducted to obtain 5.7 liter of vinegar MOROMI at 8.1% alcohol concentration and containing 2.1% of vinegar MOROMI and 142 mg/100 ml of soluble nitrogen. It was passed through 200 ml of strongly acidic cationic exchange resin XT-1004 previously activated with HCl to obtain 5.5 liter of vinegar MOROMI containing 56 mg/100 ml of soluble nitrogen.

Then, acetic acid fermentation and fine filtration were applied in the same procedures as in Example 1 to obtain excellent rice vinegar of enriched flavor.

Example 7

Rice was pulverized by 1 kg and 5.5 liter of vinegar MOROMI at 8.1% alcohol concentration and 2.1% acidity was obtained in accordance with the procedures in Example 1. 0.75 liter of saccharide liquid at 22% saccharide concentration prepared from the rice as the starting material was added to the resultant vinegar MOROMI and aerated acetic acid fermentation was applied. 6.25 liter of a fermentation liquid at 10.2% acidity and 1.5% gluconic acid concentration was finally obtained.

The fermentation liquid was applied with the same fine filtration as in Example 1 to obtain a product at 4.5% acidity containing 0.7% of gluconic acid. The resultant rice vinegar was excellent having mild sourness and enriched flavor.

Example 8

660 g of glucose and 2.5 liter of charged water were added to 3.1 liter of vinegar MOROMI at 8.1% alcohol concentration and 2.1% acidity obtained in accordance with Example 1 to prepare 6 liter of MOROMI at 11% glucoce concentration and 4.2% alcohol concentration.

Fermentation was conducted by adding 6 liter of the MOROMI to one liter of seed vinegar containing active acetic acid bacteria previously cultivated in aerated fermentation (8.0% acidity, 2.5% alcohol concentration). A fermentation liquid at 9% gluconic acid concentration was finally obtained. The resultant gluconic acid fermentation liquid was blended with rice vinegar to control the gluconic acid concentration to 0.5% and acidity to 4.5% in rice vinegar, and fine filtration was applied to obtain rice vinegar of enriched flavor and mild sourness.

Example 9

Rice was pulverized by 1 kg, 2.7 liter of charged water, 2 g of commercially available glucoamylase preparation applied with alkali treatment in the factory were added thereto, pH was adjusted to 4.5 with fumaric acid and alcoholic fermentation was applied at 30° C. for 6 days by adding 3 g of yeast to obtain 3.3 liter of alcohol MOROMI at 15.6% alcohol concentration and containing 127 mg/100 ml of soluble nitrogen and 380 ppm of lactic acid formed. 1.15 liter of seed vinegar (acidity 10.0%) and 1.95 liter of charged water were added, and solid-liquid separation was conducted to obtain 6.4 liter of vinegar MOROMI at 8.1% alcohol concentration and 2.1% acidity.

Then, acetic acid fermentation was conducted in the same procedures as in Example 1 to finally obtain a fermentation liquid at 10.2% acidity and containing 70 ppm of acetoin and 7000 ppm in total of valeric acid, isovaleric acid, butyric acid, isobutyric acid and propionic acid.

The fermentation liquid was adjusted to 4.5% acidity to produce rice vinegar having refresh flavor.

Example 10

Rice was pulverized by 1 kg, 2.3 liter of charged water and 4 g of α-amylase preparation were added and heated and cooked to alpharize and liquefy the starch in the starting material. Then, they were press-filtered to obtain 3.0 liter of a liquefied liquid containing 35 mg/100 ml of soluble nitrogen, 22% saccharide concentration and D.E. (dextrose equivalent) value of 25. Then, 1.2 g of flucoamylase preparation and 3 g of yeast were added to the liquid, pH was adjusted to 4.5 with fumaric acid and alcoholic fermentation was applied at 28° C. for 4 days to obtain 3.0 liter of alcohol MOROMI at 13.8% alcohol concentration. 1.1 liter of seed vinegar (10.0% acidity) and 1.2 liter of charged water were added to obtain 5.3 liter of seed vinegar at 8.1% alcohol concentration and 2.1% acidity.

Then, the same aerated acetic acid fermentation and filtering purification were applied in the same ways to adjust the acidity to 4.5% to obtain rice vinegar of refresh taste.

Example 11

Rice was pulverized by 2 kg and 6 liter of liquefied liquid containing 35 mg/100 ml of soluble nitrogen at 22% saccharide concentration and D.E. value of 25 was obtained in the same procedures as in Example 10. The resultant liquefied liquid was spray-dried using a spray drier to obtain 1.1 kg of powder from the liquefied liquid.

3.8 liter of charged water, 2 g of a glucoamylase preparation and 5 g of yeast were added to 1 kg of the resultant powder, pH was adjusted to 4.5 with fumaric acid and alcoholic fermentation was applied to obtain 4.4 liter of alcohol MOROMI at 13.7% alcohol concentration. Then, 1.55 liter of seed vinegar (10.0% acidity) and 1.75 liter of charged water were added to obtain 7.7 liter of vinegar MOROMI at 8.1% alcohol concentration and 2.1% acidity.

Then, aerated acetic acid fermentation was applied in the same procedures to obtain rice vinegar of refresh taste.

What is claimed is:

1. A process for producing rice vinegar, comprising:
   subjecting rice to saccharification, whereby a saccharified liquid is obtained,
   purifying the saccharified liquid with at least one nitrogen-removing treatment to control the amount of soluble nitrogen in the liquid, whereby a purified saccharified liquid is obtained,
   subjecting the purified saccharified liquid to alcoholic fermentation, whereby an alcoholic fermentation product is obtained,
   subjecting the alcoholic fermentation product to acetic acid fermentation using an acetic acid-producing microorganism, whereby an acetic acid fermentation product is obtained,
   adding a gluconic acid fermentation liquid to the acetic acid fermentation product,
   mixing the gluconic acid fermentation liquid with the acetic acid fermentation product to obtain a liquid mixture,
   filtering the liquid mixture by passing the mixture through an ultrafiltration membrane having a pore size of less than 0.2 μm, whereby the acetic acid-producing microorganism is removed, and
   recovering rice vinegar from the filtered liquid mixture.

2. A process according to claim 1, wherein the gluconic acid fermentation liquid is prepared from glucose or a saccharified liquid of cereals, which is subjected to an aerated acetic acid fermentation and at the same time or afterwards to a continuous aerated fermentation to obtain a fermentation liquid having a gluconic acid concentration in a range of from 0.5 to 13%.

3. A process for producing rice vinegar, comprising:
   subjecting rice to saccharification, whereby a saccharified liquid is obtained,
   subjecting the saccharified liquid to alcoholic fermentation, whereby an alcoholic fermentation product is obtained, purifying the alcoholic fermentation product with at least one nitrogen-removing treatment to control the amount of soluble nitrogen in the product, whereby a purified alcoholic fermentation product is obtained, subjecting the alcoholic fermentation product to acetic acid fermentation using an acetic acid-producing microorganism, whereby an acetic acid fermentation product is obtained, adding a gluconic acid fermentation liquid to the acetic acid fermentation product, mixing the gluconic acid fermentation liquid with the acetic acid fermentation product to obtain a liquid mixture, filtering the liquid mixture by passing the mixture through an ultrafiltration membrane having a pore size of less than 0.2 $\mu$m, whereby the acetic acid-producing microorganism is removed, and recovering rice vinegar from the filtered liquid mixture.

4. A process according to claim 3, wherein the gluconic acid fermentation liquid is prepared from glucose or a saccharified liquid of cereals, which is subjected to an aerated acetic acid fermentation and at the same time or afterwards to a continuous aerated fermentation to obtain a fermentation liquid having a gluconic acid concentration in a range of from 0.5 to 13%.

5. A process for producing rice vinegar, comprising:

subjecting rice to alcoholic fermentation while adding an enzyme preparation consisting predominantly of glucoamylase and yeast having at least a partially deactivated protease activity of less than 700 units to control the amount of soluble nitrogen and lactic acid formed during alcoholic fermentation, whereby an alcoholic fermentation product is obtained, separating the resultant solid content from the alcoholic fermentation product to obtain a liquid solution, conducting acetic acid fermentation of the liquid solution, whereby an acetic acid fermentation product is obtained, and recovering rice vinegar from the acetic acid fermentation product, wherein said process is conducted in the absence of malt.

* * * * *